(12) United States Patent
Butvinik et al.

(10) Patent No.: US 11,361,254 B2
(45) Date of Patent: Jun. 14, 2022

(54) COMPUTERIZED-SYSTEM AND METHOD FOR GENERATING A REDUCED SIZE SUPERIOR LABELED TRAINING DATASET FOR A HIGH-ACCURACY MACHINE LEARNING CLASSIFICATION MODEL FOR EXTREME CLASS IMBALANCE OF INSTANCES

(71) Applicant: Actimize LTD., Ra'anana (IL)

(72) Inventors: Danny Butvinik, Haifa (IL); Yoav Avneon, Ness-Zyiona (IL)

(73) Assignee: ACTIMIZE LTD, Ra'anana (IL)

( * ) Notice: Subject to any disclaimer, the term of this patent is extended or adjusted under 35 U.S.C. 154(b) by 380 days.

(21) Appl. No.: 16/798,473

(22) Filed: Feb. 24, 2020

(65) Prior Publication Data

US 2021/0264318 A1 Aug. 26, 2021

(51) Int. Cl.
*G06N 20/10* (2019.01)
*G06K 9/62* (2022.01)
*G06N 3/04* (2006.01)

(52) U.S. Cl.
CPC ........... *G06N 20/10* (2019.01); *G06K 9/6218* (2013.01); *G06K 9/6256* (2013.01); *G06K 9/6267* (2013.01); *G06N 3/0481* (2013.01)

(58) Field of Classification Search
CPC .... G06K 9/6218; G06K 9/622; G06K 9/6256; G06K 9/6267; G06K 9/6269; G06N 20/10; G06N 20/20; G06N 3/0481; G06Q 30/018; G06Q 30/0609; G06Q 40/00
See application file for complete search history.

(56) References Cited

U.S. PATENT DOCUMENTS

| 9,589,045 | B2 * | 3/2017 | Levitan | G06F 16/322 |
| 2017/0236055 | A1 * | 8/2017 | Lin | G06N 3/08 |
| | | | | 706/20 |
| 2019/0354993 | A1 * | 11/2019 | Ben-Or | G06N 20/20 |

* cited by examiner

*Primary Examiner* — Ruiping Li
(74) *Attorney, Agent, or Firm* — Soroker Agmon Nordman

(57) ABSTRACT

A computerized-system and method for generating a reduced-size superior labeled training-dataset for a high-accuracy machine-learning-classification model for extreme class imbalance by: (a) retrieving minority and majority class instances to mark them as related to an initial dataset; (b) retrieving a sample of majority instances; (c) selecting an instance to operate a clustering classification model on it and the instances marked as related to the initial dataset to yield clusters; (d) operating a learner model to: (i) measure each instance in the yielded clusters according to a differentiability and an indicativeness estimators; (ii) mark measured instances as related to an intermediate training dataset according to the differentiability and the indicativeness estimators; (e) repeating until a preconfigured condition is met; (f) applying a variation estimator on all marked instances as related to an intermediate training dataset to select most distant instances; and (g) marking the instances as related to a superior training-dataset.

28 Claims, 10 Drawing Sheets

COMPUTERIZED-SYSTEM AND METHOD FOR GENERATING A REDUCED SIZE SUPERIOR LABELED TRAINING DATASET FOR A HIGH-ACCURACY MACHINE LEARNING CLASSIFICATION MODEL FOR EXTREME CLASS IMBALANCE OF INSTANCES

TECHNICAL FIELD

The present disclosure relates to the field of extremely rare event prediction by machine learning models and more specifically, to generation of a training dataset to maximize the performance accuracy of the machine learning models in real-time.

BACKGROUND

Anomaly detection is the detection of rare events or instances such as network security breaches, extraordinary financial transactions, or exceptional number of logins into a system per period. Any event that its details are being transformed to a digitized form or that is being measured numerically, including machine performance, may be subject to anomaly detection. The rarity of the events or instances makes it difficult to fully study all its details for later on classification and detection as such. Other examples of anomaly detection are: payment anomalies per period in the financial system, extreme measurements of certain mechanical processes of a machine or mechanical breakdowns in machines and extreme deviation from the mean of some mechanisms. Anomaly detection is crucial in many industries such as healthcare frauds, mass marketing frauds and corporate, among others as it happens rarely but must be detected to prevent losses.

Machine learning risk models are commonly deployed in systems for anomaly detection or for classifying rare events in the field of financial crime risk management for risk prediction of extremely rare events e.g., fraud detection. Such anomaly detection may be implemented to detect fraud due to its high impact on losses of financial institutions. There are various types of frauds in the field of crime risk management such as: credit card frauds, financial transactions which are related to money laundering and fraud insurance claims.

Anomaly detection such as financial fraud is an issue with far reaching consequences in many organizations in the finance industry, government, corporate sectors, and for consumers of these organizations. New technologies such as cloud and mobile computing in recent years has compounded the problem. For that reason, financial institutions have turned to automated processes using numerical and computational methods. Data mining based approaches have been shown to be useful because of their ability to identify small anomalies in large datasets.

Currently, machine learning classifying models such as fraud detection models in fraud detection systems are trained on extremely imbalanced datasets. In imbalanced datasets, the instances of the rare events are by far fewer than the instances of the events which occur often.

For example, financial transactions data that the classifying models are receiving from a customer, e.g., a financial institute who wishes to classify its financial transactions. Such data is labeled only with rare events, e.g., fraudulent events and the non-labeled data is assumed to be non-fraudulent. Consequently, there is an extreme imbalance between the number of instances, e.g., financial transactions, which are labeled as fraud, and the rest of the instances, which is labeled as non-fraud. In financial crime risk management, existing machine learning models suffer from extreme class imbalance as a result of the rarity nature of the fraudulent transactions, currently the ratio is estimated as 1:10,000.

The accuracy of the classification of the machine learning models as carried out in current systems heavily depends on well balanced datasets. Consequently, for example, fraud detection systems having a trained machine learning model are limited by the skewed distribution between rare transactions i.e., minority class and the other transactions which are the majority class, that is used to train the machine learning model and test it. Hence, current fraud detection systems provide inaccurate classifications of data that is partly false positive and false negative.

Accordingly, there is a need for a technical solution to train a machine learning model that would instantly detect and block a given fraudulent transaction in order to provide better security and user experience. Accordingly, there is a need in a superior training dataset, built upon existing supervised fraud detection algorithms, to handle critical rarity fraud problem and extreme skewed dataset distribution, non-differentiable, non-indicative and large variational massive majority class of genuine instances e.g., transactions.

Moreover, there is a need in a system and method for generating a reduced size superior labeled training dataset for a high-accuracy machine learning classification model for extreme class imbalance of instances.

SUMMARY

There is thus provided, in accordance with some embodiments of the present disclosure, a computerized-system for generating a reduced size superior labeled training dataset for a high-accuracy machine learning classification model for extreme class imbalance.

In accordance with some embodiments of the present disclosure, the computerized-system includes: a database of majority labeled class instances, a database of minority labeled class instances, a superior labeled training database for a machine learning classification model, a memory to store the database of majority labeled class instances, the database of minority labeled class instances; and the superior labeled training database and a processor.

Furthermore, in accordance with some embodiments of the present disclosure, the processor may be configured to perform the following: (a) retrieve instances from the database of minority labeled class instances and a preconfigured amount of instances from the database of majority labeled class instances to mark the retrieved instances as related to an initial dataset; (b) retrieve a pool-based sample of instances from the majority labeled class instances database; (c) select an instance to operate a clustering classification model on the selected instance and the instances that are marked as related to the initial dataset to yield clusters; and (d) operate a learner model to: (i) measure each instance in the yielded clusters according to a differentiability estimator and an indicativeness estimator, and (ii) mark measured instances as related to an intermediate training dataset according to a predefined measurement of the differentiability estimator and a predefined measurement of the indicativeness estimator;

(e) repeat steps (c) through (d) until a preconfigured condition is met;

(f) apply a variation estimator on all marked instances as related to an intermediate training dataset to select most distant instances;

(g) mark the selected most distant instances as related to a superior training dataset;

(h) check if the preconfigured condition is met, if not mark the superior training dataset as related to the initial dataset and repeat steps (b) through (h) until the preconfigured condition is met, if yes proceed to step (i); and (i) store the instances marked as related to a superior training dataset in the superior labeled training database as part of a reduced size superior labeled training dataset.

Furthermore, in accordance with some embodiments of the present disclosure, the processor may be further configured to provide the superior labeled training database to a machine learning classification model for training purposes resulting in accurate performance of the classification model.

Furthermore, in accordance with some embodiments of the present disclosure, the clustering classification may be an Optimal Experimental Design (OED) based Support Vector Machine (SVM).

Furthermore, in accordance with some embodiments of the present disclosure, the preconfigured condition may be having a preconfigured amount of instances or having preconfigured percentage of the amount of the instances in the majority labeled class instances.

Furthermore, in accordance with some embodiments of the present disclosure, the differentiability estimator is measured according to a calculated entropy of a calculated distribution of instances which are marked as related to a reduced size superior labeled training dataset and instances in the superior labeled training database.

Furthermore, in accordance with some embodiments of the present disclosure, the indicativeness estimator may be measured according to a computed average distance between an instance in the pool-based sample and instances which are marked as related to a reduced size superior labeled training dataset and instances in the superior labeled training database.

Furthermore, in accordance with some embodiments of the present disclosure, the distance may be measured by applying an SVM kernel function.

Furthermore, in accordance with some embodiments of the present disclosure, a type of the kernel function may be preconfigured by a user via an input device and a display unit.

Furthermore, in accordance with some embodiments of the present disclosure, the SVM kernel function may be selected from: linear, nonlinear, polynomial, sigmoid and Gaussian.

Furthermore, in accordance with some embodiments of the present disclosure, the variation estimator may be operated by an agglomerative hierarchical clustering on said clusters to calculate a centroid of each cluster of instances.

Furthermore, in accordance with some embodiments of the present disclosure, the variation estimator may be further operated by selecting clusters according to the calculated centroid and then selecting a preconfigured amount of instances from the selected clusters according to largest distance therebetween.

Furthermore, in accordance with some embodiments of the present disclosure, the instances may comprise financial transactions and the minority class instances are suspicious financial activity instances and the majority class instances are non-suspicious financial activity instances.

Furthermore, in accordance with some embodiments of the present disclosure, each of the suspicious financial activity instances may be a bank account activity performed by an unauthorized entity, a financial transaction performed for money laundering, or a credit card suspicious financial activity.

Furthermore, in accordance with some embodiments of the present disclosure, the instances may comprise insurance claims and the minority class instances may be suspicious financial activity instances and the majority class instances may be non-suspicious financial activity instances.

There is further provided, in accordance with some embodiments of the present disclosure, a computerized-method for generating a reduced size superior labeled training dataset for a high-accuracy machine learning classification model for extreme class imbalance.

Furthermore, in accordance with some embodiments of the present disclosure, the computerized-method may be configured to:

(a) retrieve instances from the database of minority labeled class instances and a preconfigured amount of instances from the database of majority labeled class instances to mark the retrieved instances as related to an initial dataset;

(b) retrieve a pool-based sample of instances from the majority labeled class instances database;

(c) select an instance to operate a clustering classification model on the selected instance and the instances that are marked as related to the initial dataset to yield clusters;

(d) operate a learner model to:
  i. measure each instance in the yielded clusters according to a differentiability estimator and an indicativeness estimator, and
  ii. mark measured instances as related to an intermediate training dataset according to a predefined measurement of the differentiability estimator and a predefined measurement of the indicativeness estimator;

(e) repeat steps (c) through (d) until a preconfigured condition is met;

(f) apply a variation estimator on all marked instances as related to an intermediate training dataset to select most distant instances;

(g) mark the selected most distant instances as related to a superior training dataset;

(h) check if the preconfigured condition is met, if not mark the superior training dataset as related to the initial dataset and repeat steps (b) through (h) until the preconfigured condition is met, if yes proceed to step (i); and (i) store the marked as related to a superior training dataset in the superior labeled training database as part of a reduced size superior labeled training dataset.

Furthermore, in accordance with some embodiments of the present disclosure, the superior labeled training database may be provided to a machine learning classification model for training purposes, resulting in accurate performance of the classification model.

Furthermore, in accordance with some embodiments of the present disclosure, the clustering classification may be an Optimal Experimental Design (OED) based Support Vector Machine (SVM).

Furthermore, in accordance with some embodiments of the present disclosure, the preconfigured condition may be having a preconfigured amount of instances or having preconfigured percentage of the amount of the instances in the majority labeled class instances.

Furthermore, in accordance with some embodiments of the present disclosure, the differentiability estimator may be measured according to a calculated entropy of a calculated distribution of instances which are marked as related to a reduced size superior labeled training dataset and instances in the superior labeled training database.

Furthermore, in accordance with some embodiments of the present disclosure, the indicativeness estimator may be measured according to a computed average distance between an instance in the pool-based sample and instances which are marked as related to a reduced size superior labeled training dataset and instances in the superior labeled training database.

Furthermore, in accordance with some embodiments of the present disclosure, the distance may be measured by applying an SVM kernel function.

Furthermore, in accordance with some embodiments of the present disclosure, a type of the kernel function may be preconfigured by a user via an input device and a display unit.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

Figure 1:
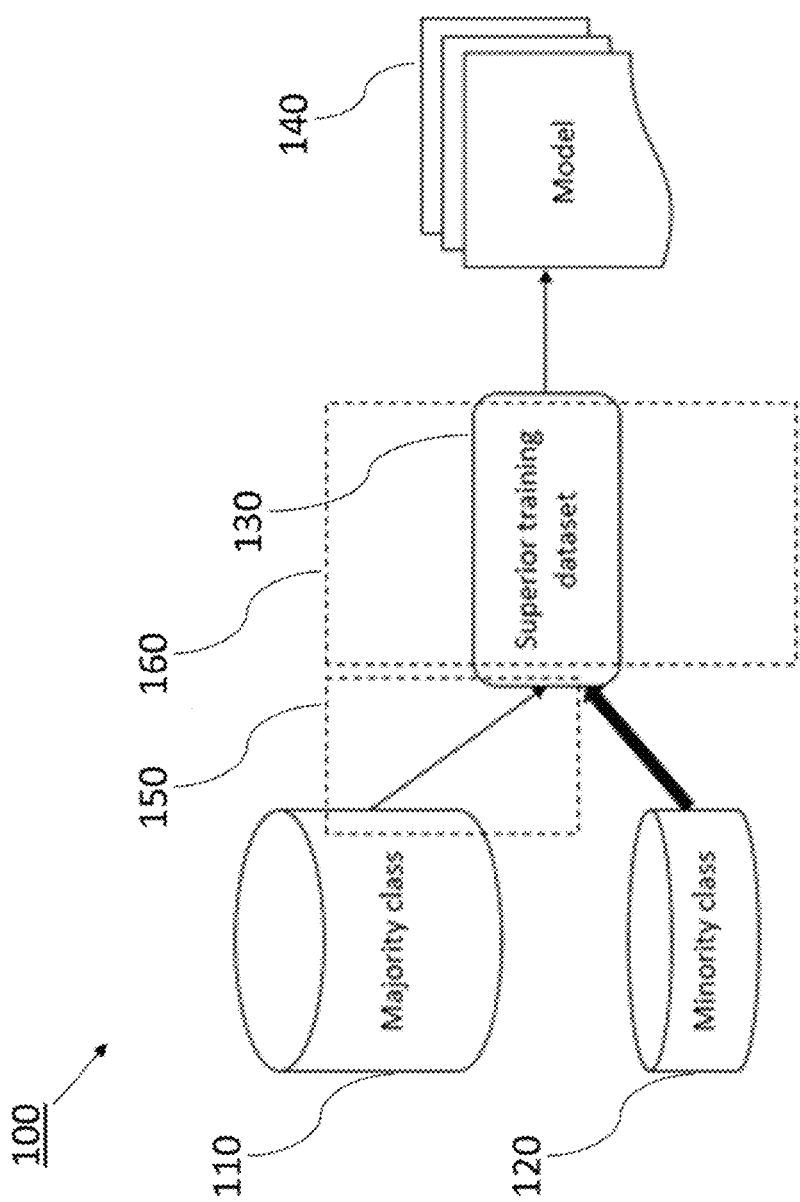
FIG. 1 schematically illustrates a high-level diagram of a computerized-system for generating a reduced size superior labeled training dataset for a high-accuracy machine learning classification model for extreme class imbalance, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "Suspicious Financial Activity" as used herein refers to a fraud activity.

The term "feature space" as used herein refers to a dataset of instances.

The term "instance" as used herein refers to an event that its details are being transformed to a digitized form or an event that is being measured numerically.

The term "majority class" as used herein relates to frequent instances in a skewed distribution of data, i.e., imbalanced data.

The term "minority class" as used herein relates to rare instances in imbalanced data.

Prediction of extremely rare events such as prediction of a financial risk may be performed by machine learning models. Commonly, after these machine learning models are trained on relevant datasets before they are being operated in prediction systems to classify events.

The accuracy of the classification of the machine learning models is mainly impacted by the quality of the training dataset that the machine learning models have been trained on. Therefore, imbalanced data received by these models for training might impair detection of rare events. The data for training may be imbalanced when most of the instances are of a certain class i.e., majority class and only few instances are of another class, i.e., minority class.

There are many reasons for which the data may be imbalanced. In the finance industry for example, one of them may be due to the fact that only a small percentage of customers of the organization have experienced a fraudulent activity and related instances have been labeled as fraud, i.e., minority class. The challenge of predicting rare events like fraud detection lies in detecting these events in a real-time transaction stream where there are imbalanced datasets i.e., instances of minority and majority classes, and when sometimes there is no minority class at all.

Consequently, it is harder to train the machine learning models which are deployed in Fraud Detection Systems to accurately classify data. The ramifications are for example, classification of legitimate instances as fraud i.e. false positive, and declining of legitimate transactions. Commonly, declining of legitimate transactions results in a poor user experience for genuine customers of the organization.

When many financial transactions might be considered fraudulent, while actually, the transactions are non-fraudulent e.g., False-Positives (FP) and vice versa, a fraudulent transaction may also seem to be legitimate, e.g., False-Negatives (FN), the data may be considered as overlapping. Hence, obtaining low rate of FPs and FNs is a key challenge of Fraud Detection Systems (FDS).

An event of fraud may occur in finance, real estate, investment, insurance and other industries. Fraud may also occur during trade of real estate, or personal property, such as art and collectibles, as well as during trade of intangible property, such as stocks and bonds. Types of fraud may include tax fraud, credit card fraud, wire fraud, securities fraud, and bankruptcy fraud. Frauds can range from really small like non-payment for e-commerce orders to a threat to the organization's existence like public exposure of customers' credit card details.

Sometimes, to save the costs of manual fraud detection, systems in financial institutes, such as insurers, might skip a thorough investigation of a small claim to save related expenses and pay it even if it might be an insurance fraud, since, thoroughly reviewing an insurance claim might take a long time and incur high cost.

That is why, fraud detection is one of the top priorities for financial institutions, which can be addressed by deploying machine learning models in the FDS. According to a report published by Nilson, in 2017, the worldwide losses in card fraud related cases reached 22.8 billion dollars. The problem is forecasted to get worse in the following years, by 2021, the card fraud bill is expected to be 32.96 billion dollars. According to a 2015 report from Javelin Strategy, 15% of all cardholders have had at least one transaction incorrectly declined in the previous year, representing an annual decline amount of almost $118 billion. Nearly 4 in 10 declined cardholders report that they have abandoned their card after being falsely declined.

However, when a fraudulent transaction is not detected, effectively meaning that the machine learning classification model of the fraud detection system, predicts that a fraudulent transaction is non-fraudulent when it is really fraudulent e.g., false negative, then losses to the organization might be very high and the fraudster might not be caught and get away with it.

A fraudulent activity which may be carried out by one individual, a group of individuals or a business firm is commonly performed through one or more systems of an organization. These systems of the organization are responsible to detect the fraudulent activity that is related to one or more victims or else the reputation of the organization will be affected and it might deter future prospects and current customers alike to transact with it. Additionally, it takes the so called "good" customers away from the organization while attracting more fraudsters. Given the scale and reach of most of these vulnerable organizations, it has become indispensable for them to stop these frauds from happening or even predict all suspicious actions beforehand at all times. Accordingly, fraud detection has been one of the major challenges for most organizations particularly those in banking, finance, retail, e-commerce, investment, and insurance.

There is a need for a novel approach for generating a superior feature space with much fewer labeled instances, which are differentiable, indicative and variational in context of the entire majority class. That is, there is a need in a technical solution for generation of a superior training dataset that may be provided to an existing machine learning classification model for training purposes for high-level accuracy of classification thereof. So once the machine learning classification model receives a real-world data, the classification model may have an expeditious and dexterous training based on the superior training dataset to detect fraud in a supervised manner.

FIG. 1 schematically illustrates a high-level diagram of a computerized-system 100 for generating a reduced size superior labeled training dataset for a high-accuracy machine learning classification model for extreme class imbalance, in accordance with some embodiments of the present disclosure.

According to some embodiments, a customer such as a financial institute may provide the computerized-system 100 instances e.g., financial transactions, in a minority class database, such as minority class database 120 and instances in a majority class database such as majority class 110.

According to some embodiments, the computerized-system 100 may filter the instances to select instances from the minority class database 120 and majority class database 110 to yield training dataset such as superior training dataset 130.

According to some embodiments, the superior training dataset 130 may be provided to a machine learning classification model such as model 140 for training purposes to result in an accurate performance of the machine learning classification model. The superior training dataset 130 may be fewer labeled instances which are differentiable, indicative and variational in context of the entire majority class instances.

According to some embodiments, after the machine learning classification model such as model 140 is trained it may be implemented in the systems of the customer that has provided the minority class database 120 and the majority class instances database 110. The implemented machine learning model 140 may accurately classify in real-time instances retrieved from a database that is related to the systems of the customer, as related to the minority class or the majority class.

However, sophisticated fraudsters that are operating from globally coordinated criminal networks, continually alter their method of attack on organization systems such as individual financial institutions thereby requiring any analytic or classifying model deployment to have a degree of adaptability. Therefore, new patterns are always a significant obstacle for accurate performance of machine learning models. Subsequently, after a certain period of time, an updated superior training dataset such as superior training dataset 130 may be generated according to received updated minority class database 120 and updated majority class database 110.

According to some embodiments, instances from the database of minority class 120 and a preconfigured amount of instances from the database of majority class 110 may be retrieved to mark the retrieved instances as related to an initial dataset.

According to some embodiments, a pool-based sample of instances such as pool-based sample 150 may be retrieved from the majority class instances database 110. Then, an instance may be selected to operate a clustering classification model on the selected instance and the instances that are marked as related to the initial dataset to yield clusters.

Figure 5:
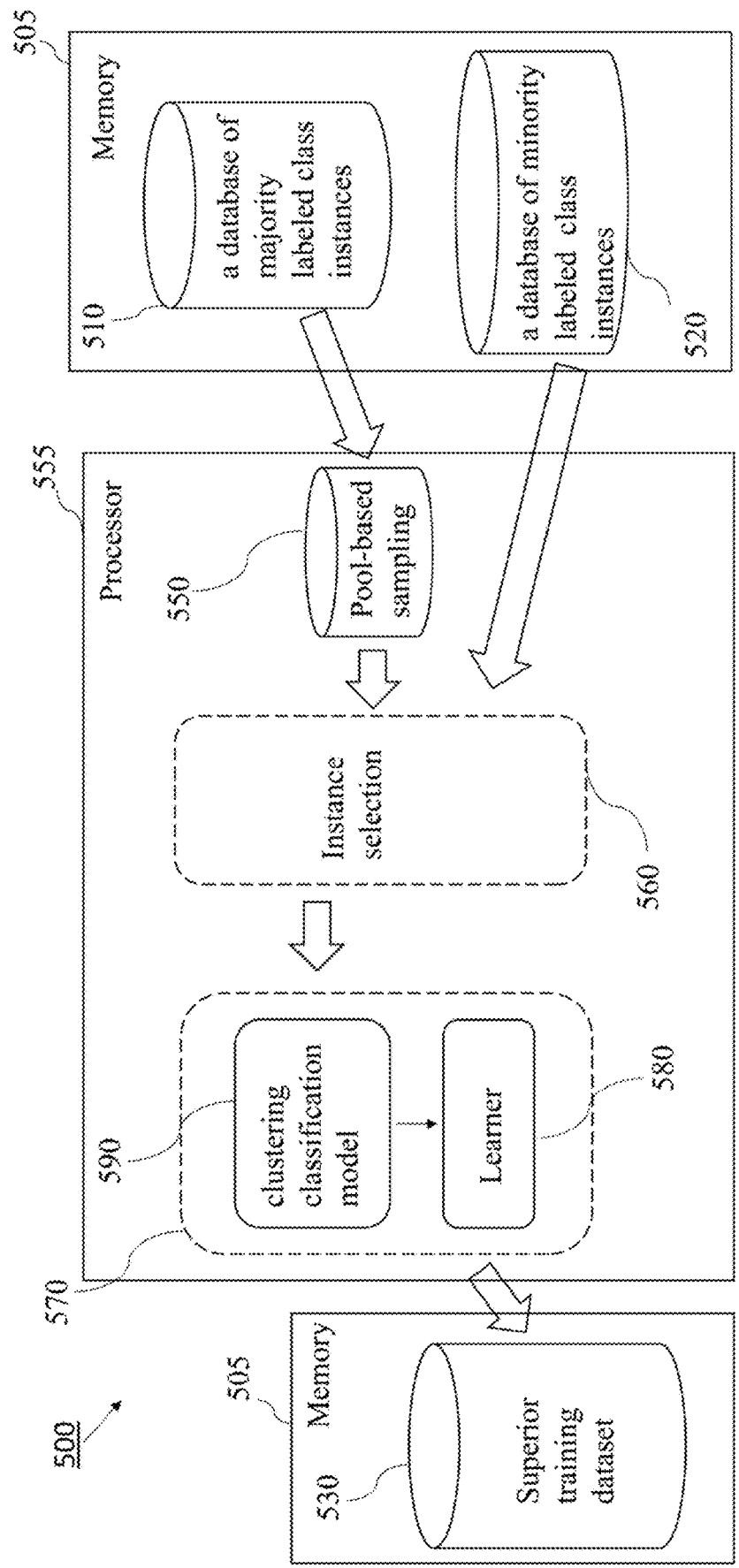
FIG. 5 schematically illustrates an architecture of a computerized-system for generating a reduced size superior labeled training dataset for a high-accuracy machine learning classification model for extreme class imbalance, in accordance with some embodiments of the present disclosure.

According to some embodiments, a learner model such as learner model 580 in FIG. 5 may be operated to measure each instance in the yielded clusters 160 to create a criteria filter by which instances are selected and marked as related to an intermediate dataset. Such criteria may be a differentiability estimator and an indicativeness estimator.

According to some embodiments, a variation estimator may be applied on all marked instances as related to an intermediate training dataset to select most distant instances. The selected most distant instances may be marked as related to a superior training dataset.

According to some embodiments, repeating retrieval of a pool-based sample of instances from the majority labeled class instances database until a preconfigured condition is met. If the preconfigured condition is met then storing the marked as related to a superior training dataset in the superior labeled training database as part of a reduced size superior labeled training dataset.

In a non-limiting example, the preconfigured condition may be having a preconfigured amount of instances or having preconfigured percentage of the amount of the instances in the majority labeled class instances that the customer has provided.

According to some embodiments, different superior training datasets may be generated based on a threshold per each embedded estimator. By this, the size of the superior training dataset may be controlled and the effect on the accuracy of the model may be measured.

Figure 2A:
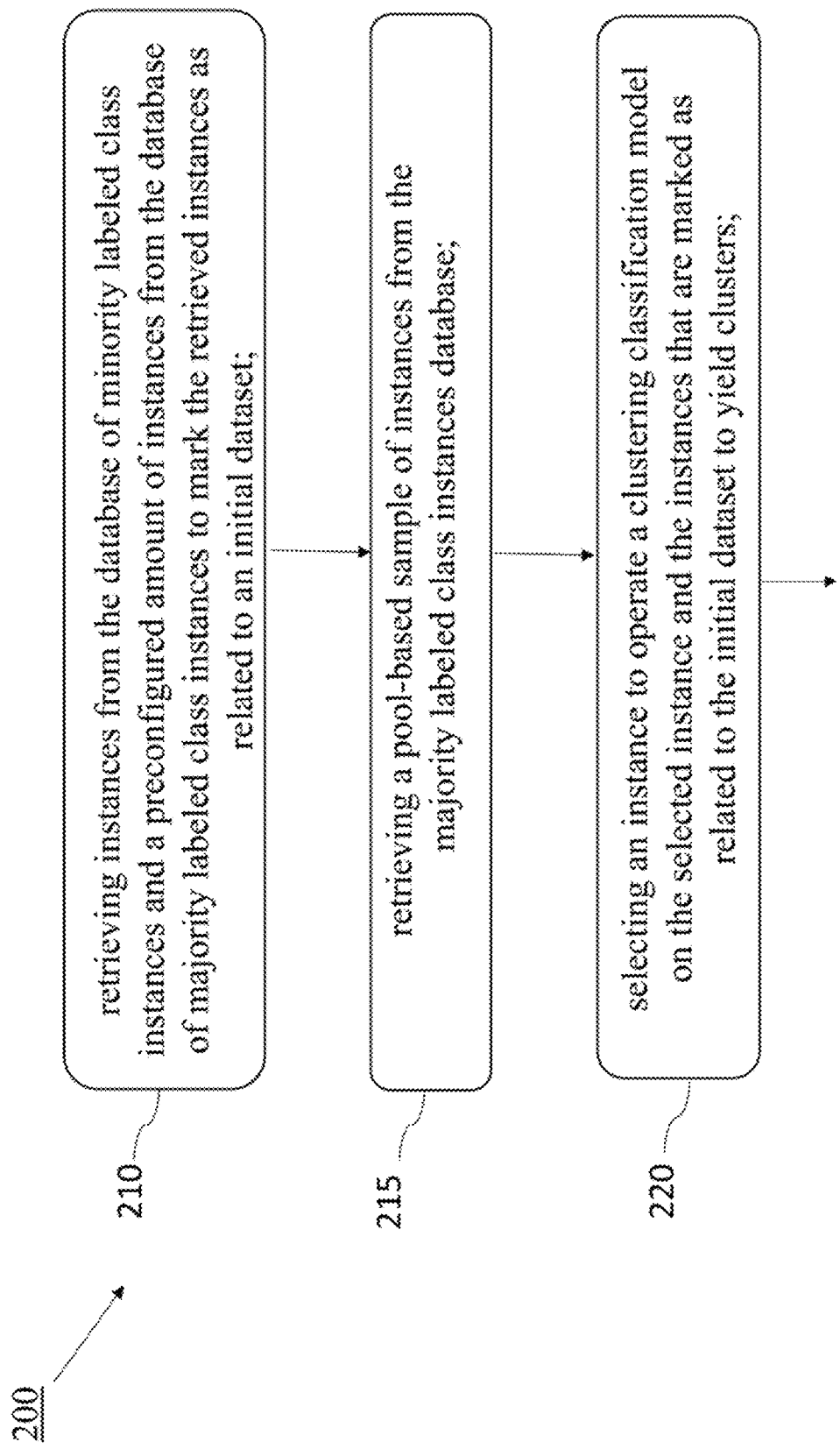
FIGS. 2A-2C a schematic flowchart of a computerized-method for generating a reduced size superior labeled training dataset for a high-accuracy machine learning classification model for extreme class imbalance, in accordance with some embodiments of the present disclosure.
Figure 2B:
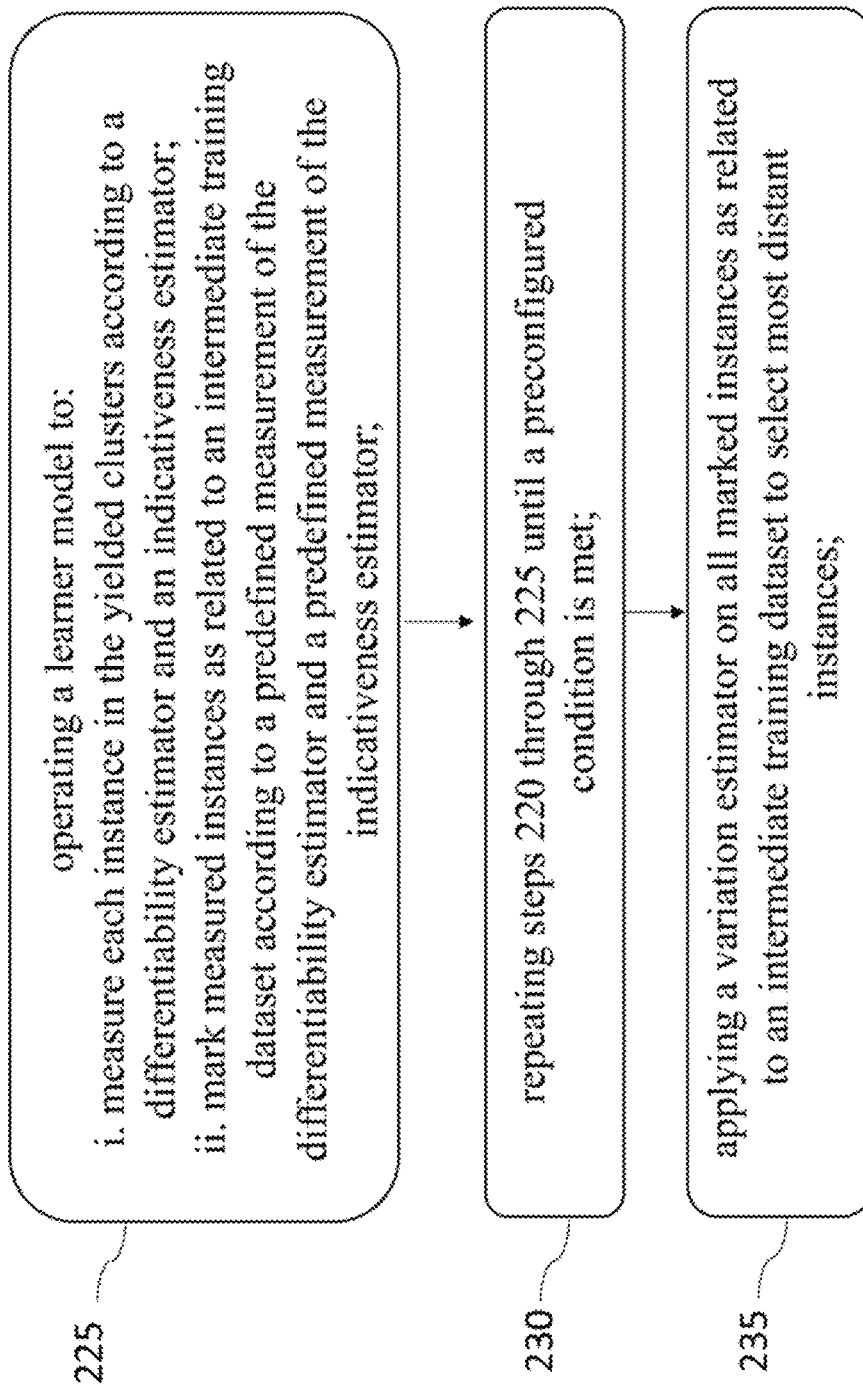
Figure 2C:
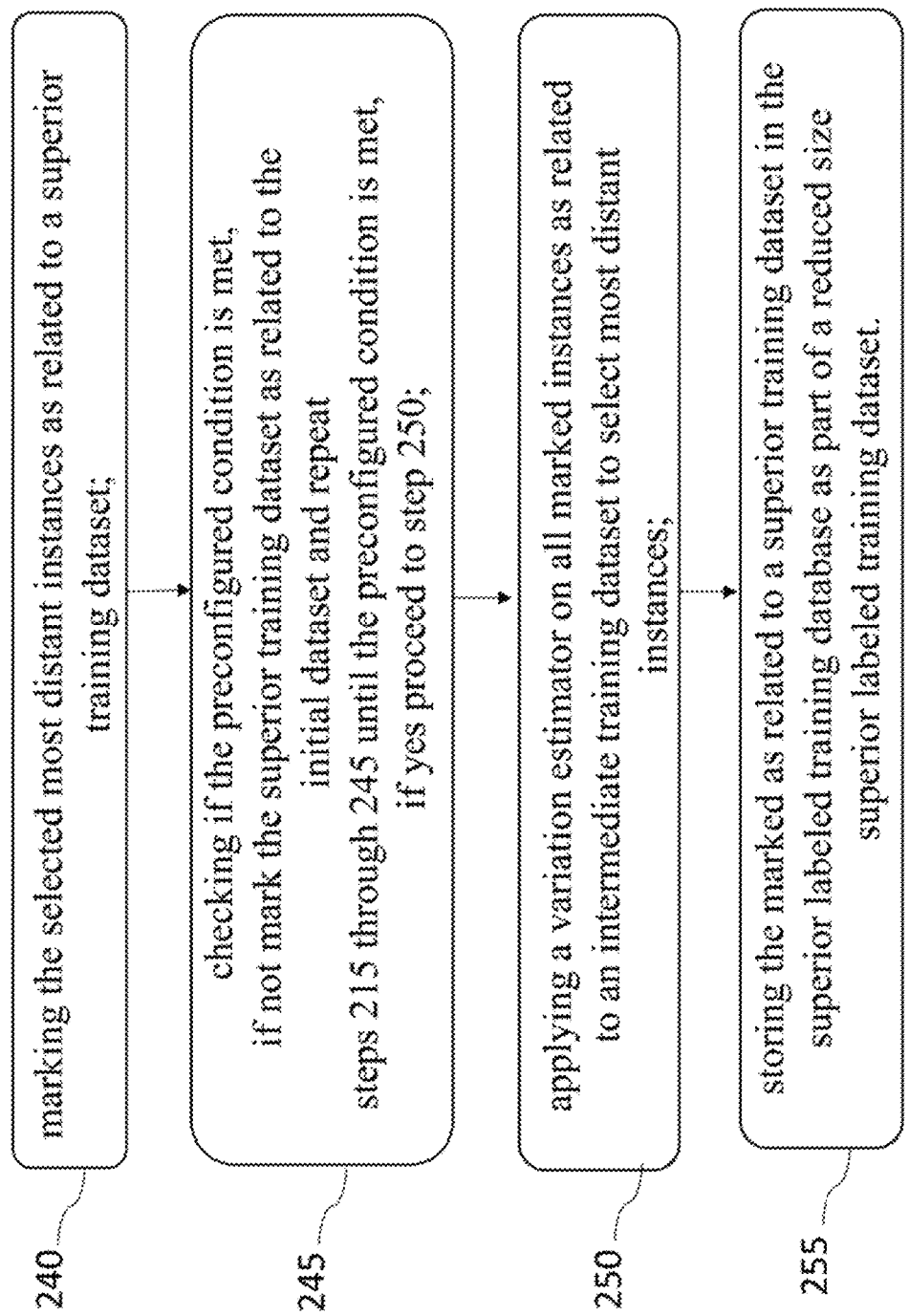

FIGS. 2A-2C are a schematic flowchart of a computerized-method 200 for generating a reduced size superior labeled training dataset for a high-accuracy machine learning classification model for extreme class imbalance, in accordance with some embodiments of the present disclosure. The steps described herein below may be performed by a processor.

According to some embodiments, operation 210 may comprise retrieving instances from the database of minority labeled class instances and a preconfigured amount of instances from the database of majority labeled class instances to mark the retrieved instances as related to an initial dataset.

According to some embodiments, operation 215 may comprise retrieving a pool-based sample of instances from the majority labeled class instances database.

According to some embodiments, operation 220 may comprise selecting an instance to operate a clustering classification model on the selected instance and the instances that are marked as related to the initial dataset to yield clusters.

According to some embodiments, operation 225 may comprise operating a learner model to: (i) measure each instance in the yielded clusters according to a differentiability estimator and an indicativeness estimator; and (ii) mark measured instances as related to an intermediate training dataset according to a predefined measurement of the differentiability estimator and a predefined measurement of the indicativeness estimator.

According to some embodiments, operation 230 may comprise repeating steps 220 through 225 until a preconfigured condition is met.

According to some embodiments, operation 235 may comprise applying a variation estimator on all marked instances as related to an intermediate training dataset to select most distant instances.

According to some embodiments, operation 240 may comprise marking the selected most distant instances as related to a superior training dataset.

According to some embodiments, operation 245 may comprise checking if the preconfigured condition is met, if not marking the superior training dataset as related to the initial dataset and repeat steps 215 through 245 until the preconfigured condition is met, if the preconfigured condition is met proceeding to step 250.

According to some embodiments, operation 250 may comprise applying a variation estimator on all marked instances as related to an intermediate training dataset to select most distant instances.

According to some embodiments, operation 255 may comprise storing the marked as related to a superior training dataset in the superior labeled training database as part of a reduced size superior labeled training dataset.

FIGS. 3A-3D schematically illustrate examples for selecting differentiable, indicative and varied instances and a combination thereof, in accordance with some embodiments of the present disclosure.

According to some embodiments, in operation 225 in FIG. 2B the learner model such as learner model in FIG. 5 may be operated to (i) measure each instance in the yielded clusters according to a differentiability estimator and an indicativeness estimator; (ii) mark measured instances as related to an intermediate training dataset according to a predefined measurement of the differentiability estimator and a predefined measurement of the indicativeness estimator. The selection of differentiable and indicative instances may be implemented according to various approaches.

Figure 3A:
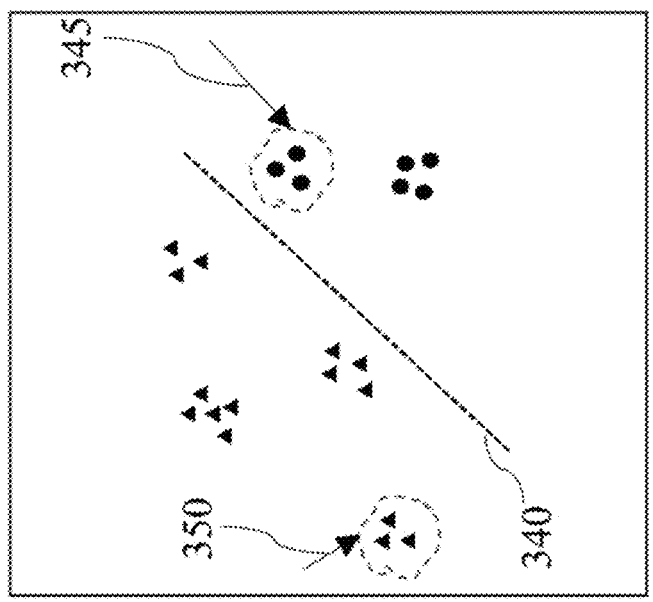
FIGS. 3A-3D schematically illustrate examples for selecting differentiable, indicative and varied instances and a combination thereof, in accordance with some embodiments of the present disclosure.
Figure 3B:
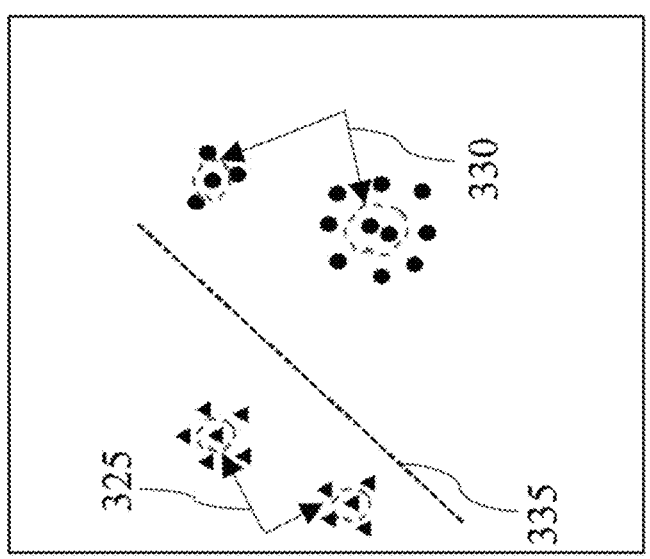
Figure 3C:
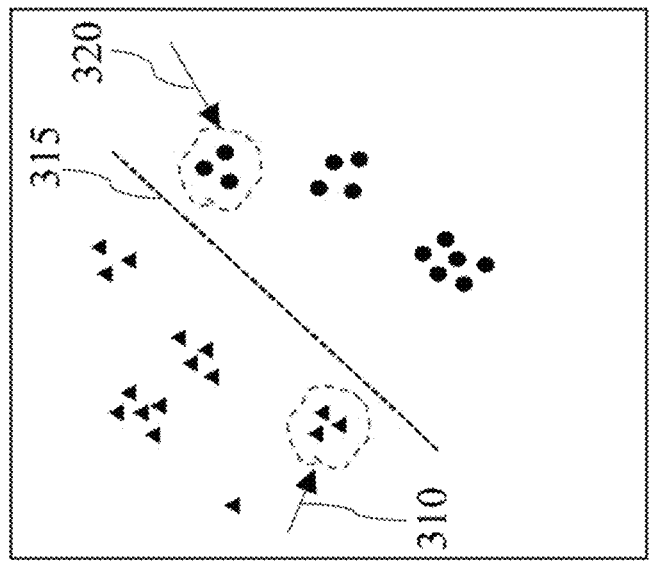

According to some embodiments, each event e.g., a transaction that is having a record of details is an instance which is translated to a point in the dataset. FIGS. 3A-3C represent an example of a binary classification approach in which every instance is translated to a point and a borderline binary separating instances from the majority class and instances from the minority class. The borderline is a decision line. A close distance between points means that the transactions have more details in common than points which are far from each other.

According to some embodiments, in FIG. 3A when embedding a differentiability estimator on a dataset, a cluster or group of instances such as cluster 310 and cluster 320 which are closer to borderline 315 are most valuable and therefore selected because they carry much more information than instances far away from the borderline 315.

According to some embodiments, in FIG. 3B the most representing and indicative instances are selected e.g., elements 325 and 330 thus, favoring indicativeness among instances, and hence reducing the redundancy of instances which indicate the local cluster or local populations.

According to some embodiments, in FIG. 3C the most distant points are selected e.g., 345 and 350 for variation purposes.

Figure 3D:
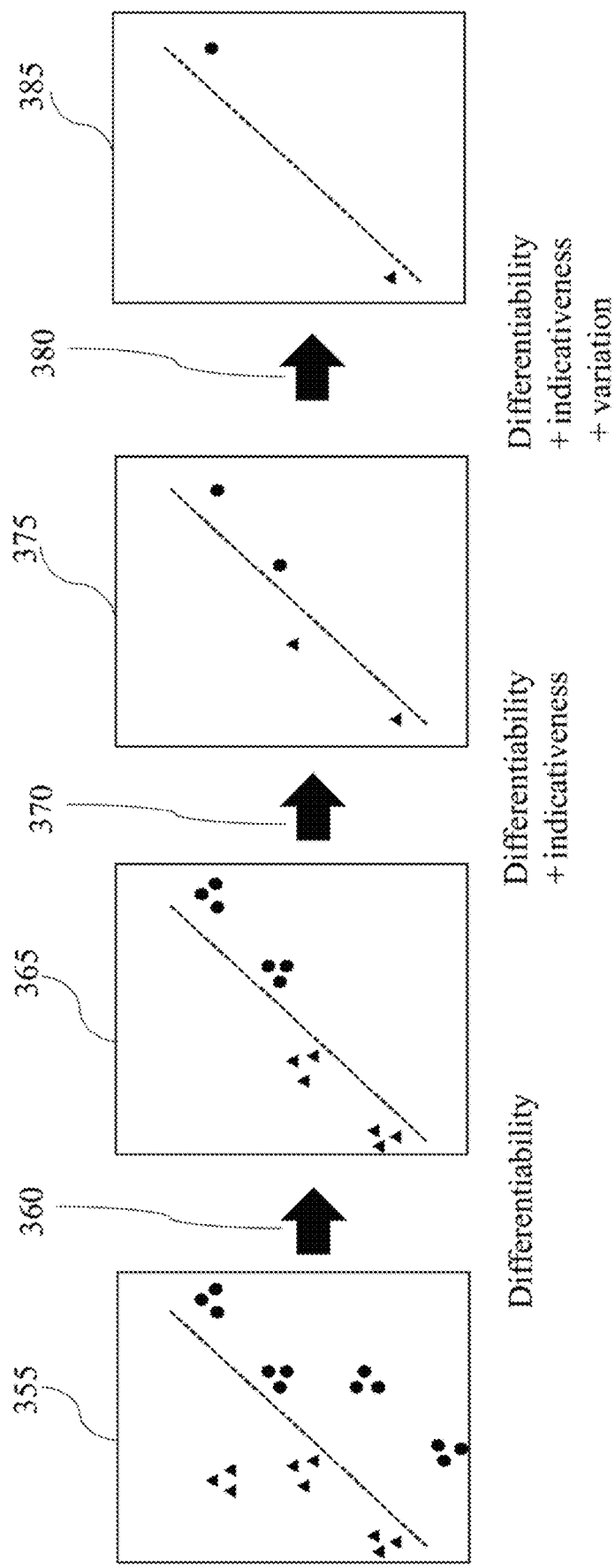

According to some embodiments, in FIG. 3D a dataset of points 355 divided by a borderline is provided. When a differentiability estimator 360 is applied on dataset 355 it results with dataset 365. When differentiability estimator and indicativeness estimator as a combination 370 are applied on dataset 365 it results with dataset 375. When differentiability estimator, indicativeness estimator and variation estimator are applied on dataset 375 as a combination 380 it results with dataset 385.

In a non-limiting example, a clustering classification learning approach may be a Support Vector Machine (SVM) binary classification. In SVM binary classification, positive and negative instances are linearly partitioned by a hyperplane (with maximum marginal distance to instances) in the original or higher dimensional feature space. In order to classify a new instance x, its distance to the hyperplane is computed and x may be assigned to a class that corresponds to the sign of the computed distance. The distance between the instance x and hyperplane P, supported by the support vectors $x_1 \ldots x_f$, may be computed as follows:

$$d(x, P) = \sum_{h=1}^{f} \alpha_h y_h x_h x^T + b_0$$

Whereby $y_h$ may be the class label of support vector $x_h$; $a_h$ and $b_y$ are numeric parameters that are determined automatically.

According to some embodiments, for multi-class classification with m classes, in one-versus-one case, a set S of $$m * \frac{(m-1)}{2}$$

hyperplanes, there is a definition of one for every class pair. The hyperplane that separates class z and w will be noted as $P_{z,w}$. For sake of mathematical order and formulation, $S_z \subset S$ may be the set of corresponding m−1 hyperplanes which separate class z from other classes.

In order to classify a new instance x, its distance to each hyperplane $P_{z,w}$ may be computed and x may be assigned to class z or w. At the final stage of this process, for each and every instance x every class z has aggregated a certain number of votes, noted by V(x) which represents the number of time a classifier has attributed the class z to instance x. The final class of x, noted by B(x) will be the one that has aggregated the highest number of votes.

$B(x)$=arg max($V_z$,$x$)

$1 \le z \le m$

According to some embodiments, the pseudo-code of the active learning algorithm may be implemented as a variation of SVM as follows:

| | |
|---|---|
| Line 1: | γ: differentiability coefficient |
| Line 2: | ℒ: labeled dataset |
| Line 3: | 𝒰: labeled pool |
| Line 4: | η(x): differentiability measure |
| Line 5: | ζ(x): indicativeness measure |
| Line 6: | $Q_I$: initial query batch size |
| Line 7: | $Q_F$: final query batch size |
| Line 8: | do: |
| Line 9: | λ = train (ℒ); $ω_I$ = ∅; |
| Line 10: | //search for most differentiable and indicative instance |
| Line 11: | for index = 1 to $Q_I$ do: |
| Line 12: | |
| Line 13: | $\tilde{x}$ = argmax[λ * η(x) + (1 − λ) * ζ(x)]<br>x∈𝒰 |
| Line 14: | $ω_I$ = $ω_I$ ∪ {$\tilde{x}$} |
| Line 15: | end |
| Line 16: | Apply agglomerative hierarchical cluster on $ω_I$ to extract set $ω_F$ of $Q_F$ variation sampls |
| Line 17: | 𝒰 = 𝒰 − $ω_F$; |
| Line 18: | ℒ = ℒ ∪ $ω_F$; |
| Line 19: | while stop criteria's satisfied |

According to some embodiments, this algorithm first trains the model 140 in FIG. 1 based on the initial labeled data, and applies a combination of differentiability and indicativeness measures to select $Q_I$ samples from the pool. Then hierarchical clustering function may be applied to the extracted samples to select $Q_F$ most diverse samples. Chosen samples are then labeled and added to the training labeled set.

This process may be iterated until at least one termination condition is satisfied. The algorithm may stop when all instances of the pool were selected and labeled. The algorithm may seem much more costly than the original SVM algorithm. However, it is only multiply by a coefficient of $N/Q_F$, (N is the final number of labeled instances) the total computational complexity of original SVM kernel function.

Figure 4:
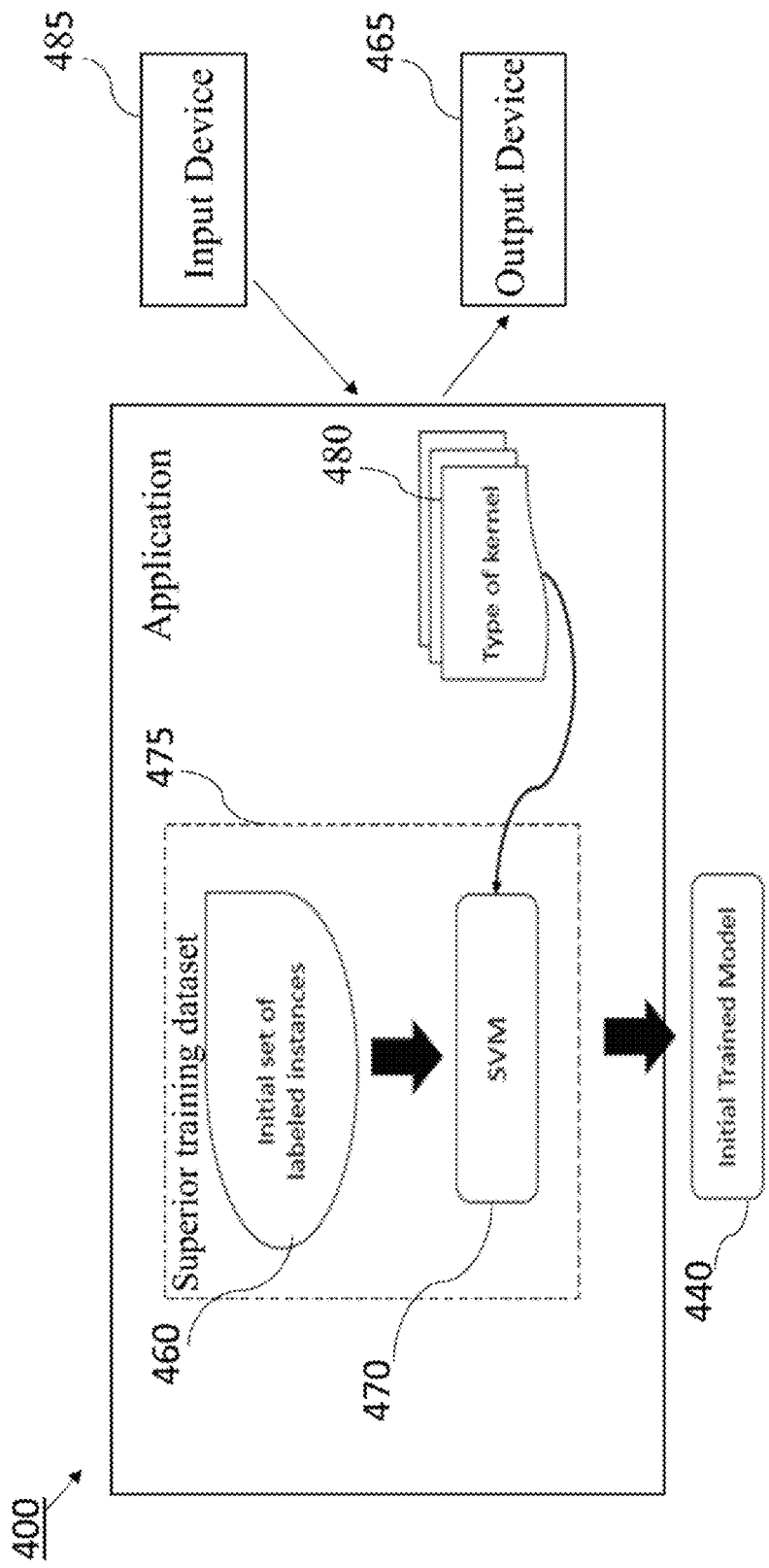
FIG. 4 schematically illustrates a high-level flow diagram depicting a computerized-method for generating a reduced size superior labeled training dataset using Support Vector Machine (SVM), according to some embodiments of the invention.

FIG. 4 schematically illustrates a high-level flow diagram depicting a computerized-system 400 for generating a reduced size superior labeled training dataset using Support Vector Machine (SVM), according to some embodiments of the invention.

In a non-limiting example, Optimal Experimental Design (OED) based SVM framework via embedded estimators provides a system for precisely balancing the data and automatically verifies annotation of massive financial datasets with high accuracy. Ad hoc Optimal Experimental Design based SVM via embedded estimators may provide a stable, precise, accurate, robust and efficient classification rate of fraudulent transactions with significantly reduced in size learning dataset.

According to some embodiments, an initial set of labeled instances 460 may be retrieved from a database of minority labeled class such as minority labeled class 120 in FIG. 1 and a preconfigured amount of instances from the database of majority labeled class such as database of majority labeled class 110 in FIG. 1, to mark the retrieved instances as related to an initial dataset.

According to some embodiments, the SVM model such as SVM model 470 may be trained based on miscellaneous types of kernel 480 i.e., kernel functions. The type of the kernel function may be preconfigured by a user via an input device and an output device such as a display unit.

According to some embodiments, the SVM kernel function may be as follows:

$$K(x_z, x_w) = \exp\left[-\frac{\|x_z - x_w\|^2}{2\sigma^2}\right]$$

According to some embodiments, the SVM kernel function of the SVM model 470 may be selected from: linear, nonlinear, polynomial, sigmoid and Gaussian.

According to some embodiments, a polynomial Gaussian kernel for Optimal Experimental Design based SVM framework may be implemented in the computerized-system 400 for generating a reduced size superior labeled training dataset for a high-accuracy machine learning classification model for extreme class imbalance. The polynomial Gaussian kernel function may transform the feature space to a high-dimensional space with an expectation that a hyperplane would be found, since imbalanced data such as financial data may be a high dimensional data, therefore the Gaussian kernel function may be assumed to fit to the domain.

According to some embodiments, a superior labeled training database such as superior training dataset 475 may be provided to a machine learning classification model for training purposes to yield an initial training model 440, resulting in accurate performance of the classification model. The machine learning model may be implemented in the form of a computer code and algorithms, and therefore may be executed in real-time.

According to some embodiments, a type of the kernel function may be preconfigured by a user via an input device such as input device 485 and an output device 465 such as a display unit. The SVM kernel function may be selected from: linear, nonlinear, polynomial, sigmoid and Gaussian.

FIG. 5 schematically illustrates an architecture of a computerized-system 500 for generating a reduced size superior labeled training dataset for a high-accuracy machine learning classification model for extreme class imbalance, in accordance with some embodiments of the present disclosure.

According to some embodiments, a superior feature space such as superior feature space 570 may be extracted out of a majority class that is stored in a database of majority labeled class instances such as database of majority labeled class instances 510 which may include for example, genuine financial transactions. The extraction of superior feature space may be implemented by a learner module such as learner model 580 which may estimate differentiability, indicativeness and variation among the majority labeled class instances.

According to some embodiments, input data may be received from an organization that is interested in high-accuracy performance of its machine learning model that is operated by the detection system implementing thereof.

According to some embodiments, the computerized-system, e.g., system 500 and computerized-method, e.g., method 200 (FIGS. 2A-2C), which are implemented by said architecture of iterative Optimal Experimental Design based SVM framework may receive as the input data a minority labeled class instances which may be stored in a database of majority labeled class instances, such as a database of majority labeled class instances 510 and a minority labeled class instances which may be stored in a database of minority labeled class instances, such as a database of minority labeled class instances 520. The databases 510 and 520 may be stored in memory 505.

According to some embodiments, the minority labeled class instances may be for example, fraudulent transactions and the majority labeled class instances may be genuine transactions of the organization. The extracted superior feature space 570 which may be stored in superior training dataset database such as superior training dataset database 530 may be provided to a machine learning classification model that is operated by the detection system for training purposes. This may result in a trained machine learning classification models such as XGBoost, Logistic Regression, k-NN etc.

According to some embodiments, a processor such as processor 555 may communicate with memory 505 to retrieve instances from the database of minority labeled class instances 520 and a pool-based sampling of instances which may be stored in pool-based sampling database such as pool-based sampling database 550 from the database of majority labeled class instances 510 and may mark the retrieved instances as related to an initial dataset (not shown).

According to some embodiments, the memory 505 may include one or more volatile or nonvolatile memory devices. The memory 505 may be utilized to store, for example, programmed instructions for operation of the processor 555, data or parameters for use by the processor 555 during operation, or results of the operation of the processor 555.

According to some embodiments, the processor 555 may be further configured to operate in accordance with programmed instructions stored in memory 505 and may include one or more processing units, e.g., of one or more computers. The processor 555 may be further capable of executing an instance selection module such as instance selection module 560 to select an instance and to operate a clustering classification model such as clustering classification model 590 on the selected instance and on the instances that are marked as related to the initial dataset to yield clusters. The clustering classification model 590 may be for example, an Optimal Experimental Design (OED) based Support Vector Machine (SVM).

According to some embodiments, the processor 555 may operate the learner model 580 to determine a superior feature space 570 by: (i) measuring each instance in the yielded clusters according to a differentiability estimator and an indicativeness estimator; and (ii) marking measured instances as related to an intermediate training dataset (not shown) according to a predefined measurement of the differentiability estimator and a predefined measurement of the indicativeness estimator. (iii) repeating the instance selection and the operation of the learner model 580 until a preconfigured condition is met.

According to some embodiments, the preconfigured condition may be a preconfigured amount of instances or having preconfigured percentage of the amount of the instances in the majority labeled class instances.

According to some embodiments, the differentiability estimator may be measured according to a calculated entropy of a calculated distribution of instances which are marked as related to a reduced size superior labeled training dataset and instances in the superior labeled training database. Differentiability is considered to be one of the most important measures of informativeness of an instance because it selects instances near a borderline, which are most informative for the reduced size superior training dataset for training purposes of the machine learning classifier model, so that when the machine learning classifier model is later on implemented in prediction systems, it will be easier for it to decide to which class the instance belongs to.

According to some embodiments, the indicativeness estimator may be measured according to a computed average distance between an instance in the pool-based sample and instances which are marked as related to a reduced size superior labeled training dataset and instances in the superior labeled training database. The distance may be measured by applying an SVM kernel function.

According to some embodiments, the variation estimator may be operated by an agglomerative hierarchical clustering on said clusters to calculate a centroid of each cluster of instances. The variation estimator may be further operated by selecting clusters according to the calculated centroid and then selecting a preconfigured amount of instances from the selected clusters according to largest distance therebetween.

According to some embodiments, the instances may comprise financial transactions and the minority class instances may be suspicious financial activity instances and the majority class instances may be non-suspicious financial activity instances.

According to some embodiments, each of the suspicious financial activity instances may be a bank account activity performed by an unauthorized entity, a financial transaction performed for money laundering, or a credit card suspicious financial activity.

According to some embodiments, the instances may comprise insurance claims and the minority class instances may be suspicious financial activity instances and the majority class instances are non-suspicious financial activity instances.

According to some embodiments, the processor 555 may be further configured to further operate the learner model 580 to apply a variation estimator on all marked instances as related to an intermediate training dataset to select most distant instances.

According to some embodiments, the variation or spread of the instances which were marked as related to the intermediate training dataset may be estimated roughly and may be selected by far distant instances or cluster of instances.

According to some embodiments, the technique applied to apply a variation estimator and to select most distant instances may be agglomerative hierarchical clustering technique or divisive hierarchical clustering technique. In agglomerative hierarchical clustering technique, initially each marked instance as related to an intermediate training dataset may be considered as an individual cluster. At each operated iteration, similar clusters merge with other clusters until one cluster or K clusters are formed. The similarity between two similar clusters may be calculated via one of the following approaches: Group Average, Distance Between Centroids, Ward's Method and others. The agglomerative approach for the variation measurement between selected instances based on differentiability and indicativeness is considered as easy to understand and easy to implement.

According to some embodiments, the learner model 580 may mark the selected most distant instances as related to a superior training dataset. Then, if the preconfigured condition is not met, the learner model 580 may mark the superior training dataset as related to the initial dataset (not shown) and repeat to retrieve a pool-based sample of instances from the majority labeled class instances database 510 and execute the instance selection module 560 to select an instance and operate learner model 580 as described above, until the preconfigured condition is met. Otherwise, if the preconfigured condition is met, the processor 555 may store the instances which were marked as related to a superior training dataset in the superior labeled training database 530 as part of a reduced size superior labeled training dataset.

According to some embodiments, the reduced size superior labeled training dataset may comprise fewer labeled instances which are differentiable, indicative and variational in context of the entire majority class.

According to some embodiments, the processor 555 may be further configured to provide the superior labeled training database 530 to a machine learning classification model for training purposes resulting in accurate performance of the classification model.

Figure 6:
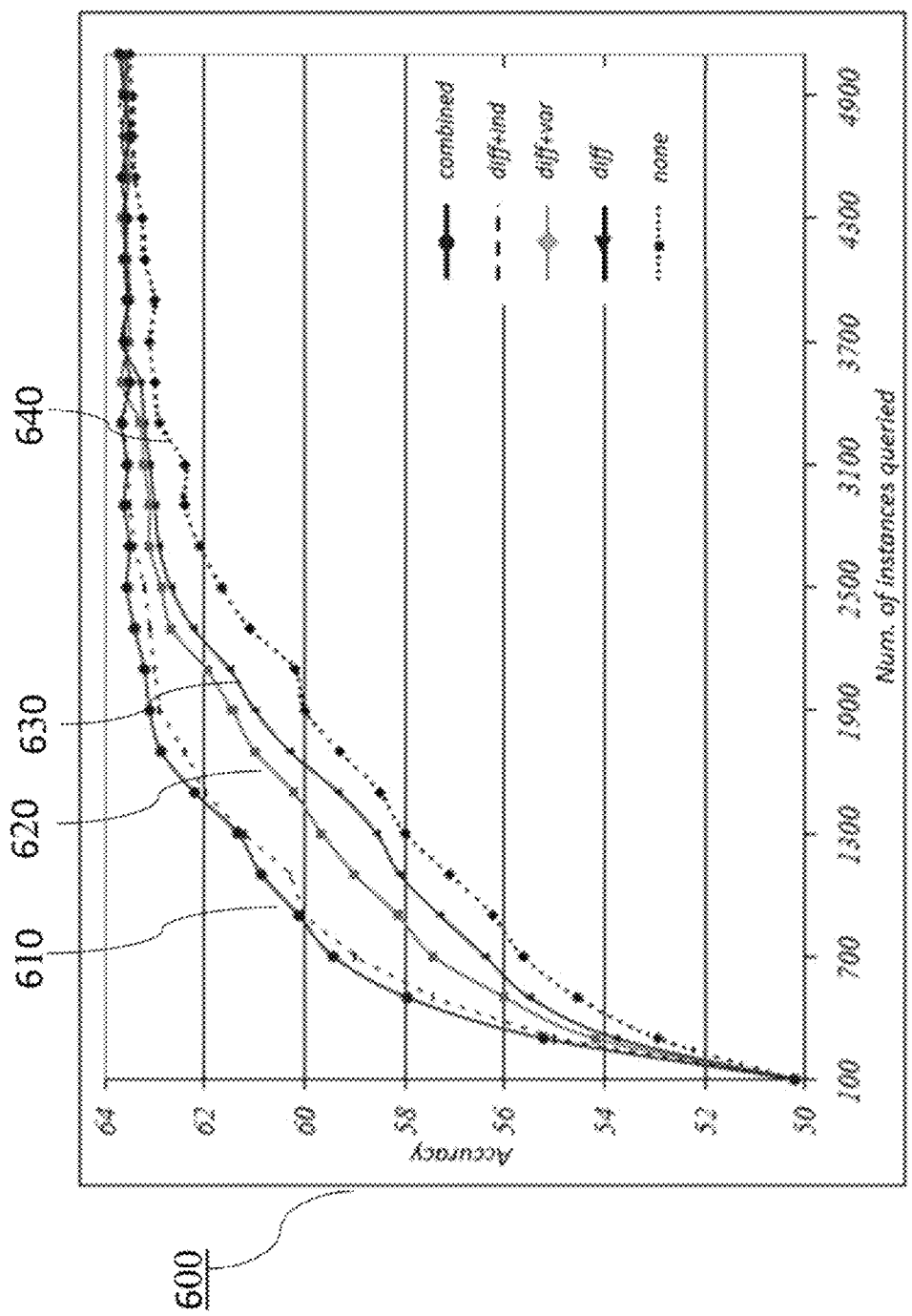
FIG. 6 schematically illustrates a graph of number of instances queried against accuracy with various estimators, according to some embodiments of the invention.

FIG. 6 schematically illustrates a graph 600 of number of instances queried against accuracy with various estimators, according to some embodiments of the invention.

Several training datasets for a high-accuracy machine learning classification model have been generated, each training dataset has been embedded with one or more estimators. Then, a machine learning classification model, XGBoost model, has been trained on each one of the generated training datasets.

Graph 600 has been created according to the results of applying each trained XGBoost model on real instances i.e., synthetic data of above 5000 instances with extreme imbalance of 1% i.e., 50 rare instances e.g., fraudulent instances. The accuracy of classification of the XGBoost model has been measured. The graph 600 shows several learning curves for Optimal Experimental Design (OED) based Support Vector Machine (SVM).

Learning curve 640 results have been received when none of the estimators have been implemented in the learner model 580 in FIG. 5. One can see that learning curve 640 has the lowest accuracy in the range of low number of instances queried.

Learning curve 630 results have been received when differentiability estimator has been implemented in the learner model 580 in FIG. 5. One can see that learning curve 630 has better accuracy in the range of low number of instances queried than learning curve 640.

Learning curve 620 results have been received when differentiability and variation estimators have been implemented in the learner model 580 in FIG. 5. One can see that learning curve 620 has better accuracy in the range of low number of instances queried than learning curve 630.

Learning curve 610 results have been received by a combined implementation of differentiability, indicativeness and variation estimators. One can see that learning curve 610 has the highest accuracy in the range of low amount of number of instances queried.

Figure 7:
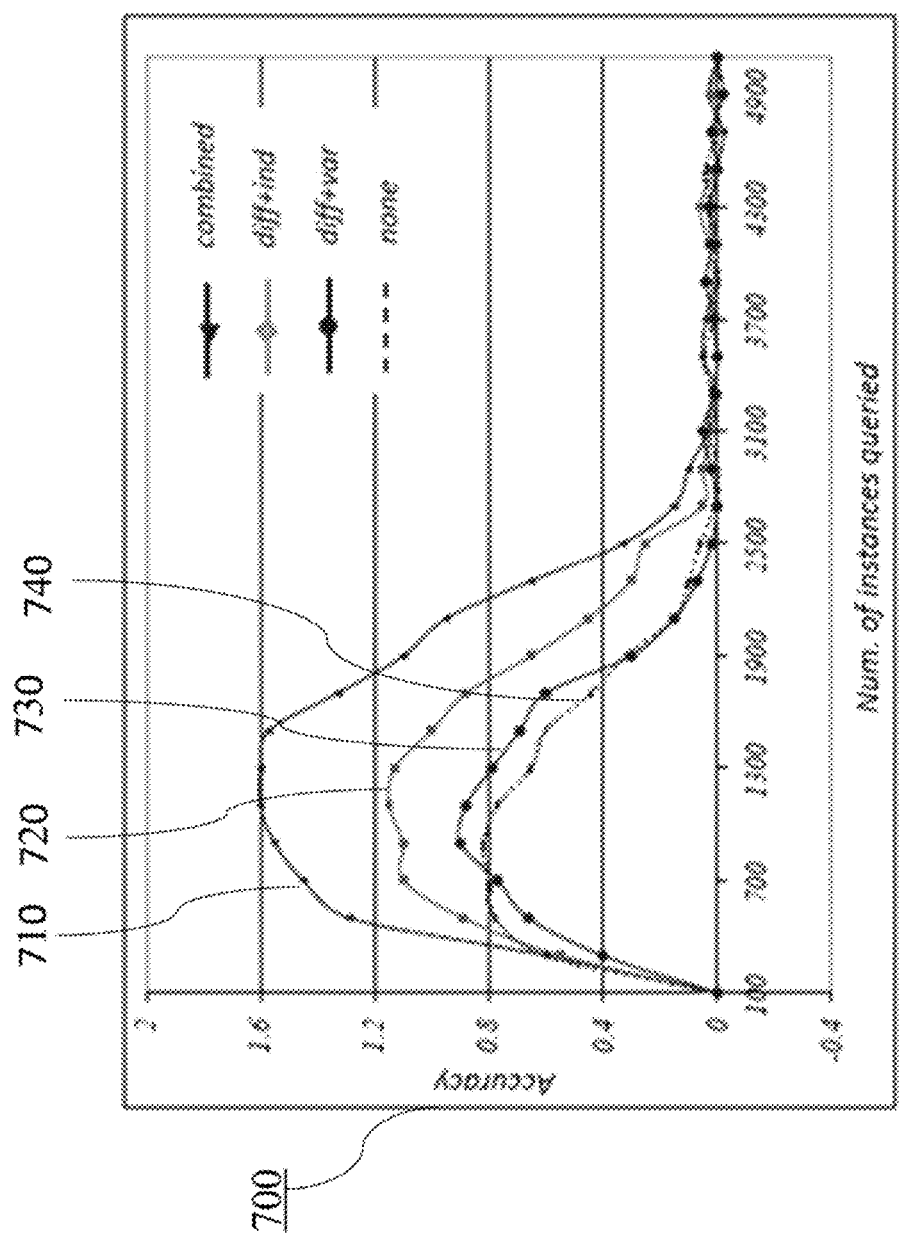
FIG. 7 schematically illustrates a graph of the performance for differentiability, indicativeness and variation estimators by different scale of accuracy change, according to some embodiments of the invention.

FIG. 7 schematically illustrates a graph 700 of representation of the performance for differentiability, indicativeness and variation estimators by different scale of accuracy change, according to some embodiments of the invention.

Graph 700 represents the amount of change in accuracy of the Optimal Experimental Design (OED) based Support Vector Machine (SVM) system with varied combination of embedded estimators. As shown in graph 600 the most impact on accuracy is when all three estimators i.e., differentiability, indicativeness and variation are combined together. Also, it is conceivable that differentiability is much more impactful than variation or indicativeness alone based on 'differentiability and variation' learning curve 730, 'differentiability and indicativeness' learning curve 720, and all combined learning curve 710.

Learning curve 740 results have been received when none of the estimators have been embedded in the learner model 580 in FIG. 5. One can see that learning curve 740 has the lowest accuracy change in the range of low number of instances queried.

Learning curve 730 results have been received when differentiability estimator has been embedded in the learner model 580 in FIG. 5. One can see that learning curve 730 has better accuracy in the range of low number of instances queried than learning curve 740.

Learning curve 720 results have been received when differentiability and variation estimators have been embedded in the learner model 580 in FIG. 5. One can see that learning curve 720 has better accuracy in the range of low number of instances queried than learning curve 730.

Learning curve 710 results have been received by a combined implementation of differentiability, indicativeness and variation estimators. One can see that learning curve 710 has the highest accuracy in the range of low amount of number of instances queried.

The results of graphs 600 and 700 have been received with three different types of estimators: differentiability, indicativeness, and variation with unique measures for selecting the most impactful instances for high-level accuracy. The results which are represented by the graphs show that the three estimators have improved drastically the learning curve of the Optimal Experiment Design based SVM under the extreme condition of imbalanced data.

Although there is no learning curve which represents applying variation estimator only moderate effect of the variation estimator may be concluded implicitly from the graph based on differentiability and variation 730 vs. differentiability and indicativeness 720.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-system for generating a reduced size superior labeled training dataset for a high-accuracy machine learning classification model for extreme class imbalance, said computerized-system comprising:
   a database of majority labeled class instances;
   a database of minority labeled class instances;
   a superior labeled training database for a machine learning classification model;
   a memory to store the database of majority labeled class instances, the database of minority labeled class instances; and the superior labeled training database; and
   a processor, said processor is configured to:
   (a) retrieve instances from the database of minority labeled class instances and a preconfigured amount of instances from the database of majority labeled class instances to mark the retrieved instances as related to an initial dataset;
   (b) retrieve a pool-based sample of instances from the majority labeled class instances database;
   (c) select an instance to operate a clustering classification model on the selected instance and the instances that are marked as related to the initial dataset to yield clusters;
   (d) operate a learner model to:
      i. measure each instance in the yielded clusters according to a differentiability estimator and an indicativeness estimator;
      ii. mark measured instances as related to an intermediate training dataset according to a predefined measurement of the differentiability estimator and a predefined measurement of the indicativeness estimator;
   (e) repeat steps (c) through (d) until a preconfigured condition is met;
   (f) apply a variation estimator on all marked instances as related to an intermediate training dataset to select most distant instances;
   (g) mark the selected most distant instances as related to a superior training dataset;
   (h) check if the preconfigured condition is met, if not mark the superior training dataset as related to the initial dataset and repeat steps (b) through (h) until the preconfigured condition is met, if yes proceed to step (i);
   (i) store the instances marked as related to a superior training dataset in the superior labeled training database as part of a reduced size superior labeled training dataset.

2. The computerized-system of claim 1, wherein the processor is further configured to provide the superior labeled training database to a machine learning classification model for training purposes resulting in accurate performance of the classification model.

3. The computerized-system of claim 1, wherein the clustering classification is an Optimal Experimental Design (OED) based Support Vector Machine (SVM).

4. The computerized-system of claim 1, wherein the preconfigured condition is having a preconfigured amount of instances or having preconfigured percentage of the amount of the instances in the majority labeled class instances.

5. The computerized-system of claim 1, wherein the differentiability estimator is measured according to a calculated entropy of a calculated distribution of instances which are marked as related to a reduced size superior labeled training dataset and instances in the superior labeled training database.

6. The computerized-system of claim 1, wherein the indicativeness estimator is measured according to a computed average distance between an instance in the pool-based sample and instances which are marked as related to a reduced size superior labeled training dataset and instances in the superior labeled training database.

7. The computerized-system of claim 6, wherein the distance is measured by applying an SVM kernel function.

8. The computerized-system of claim 7, wherein a type of the kernel function is preconfigured by a user via an input device and a display unit.

9. The computerized-system of claim 7, wherein the SVM kernel function is selected from: linear, nonlinear, polynomial, sigmoid and Gaussian.

10. The computerized-system of claim 1, wherein the variation estimator is operated by an agglomerative hierarchical clustering on said clusters to calculate a centroid of each cluster of instances.

11. The computerized-system of claim 10, wherein the variation estimator is further operated by selecting clusters according to the calculated centroid and then selecting a preconfigured amount of instances from the selected clusters according to largest distance therebetween.

12. The computerized-system of claim 1, wherein the instances comprise financial transactions and the minority class instances are suspicious financial activity instances and the majority class instances are non-suspicious financial activity instances.

13. The computerized-system of claim 12, wherein each of the suspicious financial activity instances is a bank account activity performed by an unauthorized entity, a financial transaction performed for money laundering, or a credit card suspicious financial activity.

14. The computerized-system of claim 1, wherein the instances comprise insurance claims and the minority class instances are suspicious financial activity instances and the majority class instances are non-suspicious financial activity instances.

15. A computerized-method for generating a reduced size superior labeled training dataset for a high-accuracy machine learning classification model for extreme class imbalance, said computerized-method comprising:
 (j) retrieving instances from the database of minority labeled class instances and a preconfigured amount of instances from the database of majority labeled class instances to mark the retrieved instances as related to an initial dataset;
 (k) retrieving a pool-based sample of instances from the majority labeled class instances database;
 (l) selecting an instance to operate a clustering classification model on the selected instance and the instances that are marked as related to the initial dataset to yield clusters;
 (m) operating a learner model to:
  j. measure each instance in the yielded clusters according to a differentiability estimator and an indicativeness estimator;
  ii. mark measured instances as related to an intermediate training dataset according to a predefined measurement of the differentiability estimator and a predefined measurement of the indicativeness estimator;
 (n) repeating steps (c) through (d) until a preconfigured condition is met;
 (o) applying a variation estimator on all marked instances as related to an intermediate training dataset to select most distant instances;
 (p) marking the selected most distant instances as related to a superior training dataset;
 (q) checking if the preconfigured condition is met, if not marking the superior training dataset as related to the initial dataset and repeat steps (b) through (h) until the preconfigured condition is met, if yes proceeding to step (i);
 (r) storing the instances marked as related to a superior training dataset in the superior labeled training database as part of a reduced size superior labeled training dataset.

16. The computerized-method of claim 15, wherein the superior labeled training database is provided to a machine learning classification model for training purposes resulting in accurate performance of the classification model.

17. The computerized-method of claim 15, wherein the clustering classification is an Optimal Experimental Design (OED) based Support Vector Machine (SVM).

18. The computerized-method of claim 15, wherein the preconfigured condition is having a preconfigured amount of instances or having preconfigured percentage of the amount of the instances in the majority labeled class instances.

19. The computerized-method of claim 15, wherein the differentiability estimator is measured according to a calculated entropy of a calculated distribution of instances which are marked as related to a reduced size superior labeled training dataset and instances in the superior labeled training database.

20. The computerized-method of claim 15, wherein the indicativeness estimator is measured according to a computed average distance between an instance in the pool-based sample and instances which are marked as related to a reduced size superior labeled training dataset and instances in the superior labeled training database.

21. The computerized-method of claim 15, wherein the distance is measured by applying an SVM kernel function.

22. The computerized-method of claim 21, wherein a type of the kernel function is preconfigured by a user via an input device and a display unit.

23. The computerized-method of claim 21, wherein the SVM kernel function is selected from: linear, nonlinear, polynomial, sigmoid and Gaussian.

24. The computerized-method of claim 15, wherein the variation estimator is operated by an agglomerative hierarchical clustering on said clusters to calculate a centroid of each cluster of instances.

25. The computerized-method of claim 24, wherein the variation estimator is further operated by selecting clusters according to the calculated centroid and then selecting a preconfigured amount of instances from the selected clusters according to largest distance therebetween.

26. The computerized-method of claim 15, wherein the instances comprise financial transactions and the minority class instances are suspicious financial activity instances and the majority class instances are non-suspicious financial activity instances.

27. The computerized-method of claim 26, wherein each of the suspicious financial activity instances is a bank account activity performed by an unauthorized entity, a financial transaction performed for money laundering, or a credit card suspicious financial activity.

28. The computerized-method of claim 15, wherein the instances comprise insurance claims and the minority class instances are suspicious financial activity instances and the majority class instances are non-suspicious financial activity instances.

* * * * *